(12) United States Patent
Liao

(10) Patent No.: US 6,628,752 B2
(45) Date of Patent: Sep. 30, 2003

(54) X-RAY IMAGE SENSORY SYSTEM

(76) Inventor: Kuo-Fu Liao, 5F, No. 49, Lane 249, Kuang Fu S. Rd., Taipei (TW)

( * ) Notice: Subject to any disclaimer, the term of this patent is extended or adjusted under 35 U.S.C. 154(b) by 0 days.

(21) Appl. No.: 10/014,523

(22) Filed: Dec. 14, 2001

(65) Prior Publication Data

US 2002/0126797 A1 Sep. 12, 2002

(30) Foreign Application Priority Data

Mar. 8, 2001 (TW) ..................... 90203439 U

(51) Int. Cl.$^7$ ............................... H05G 1/64
(52) U.S. Cl. .................. 378/98.8; 250/320.09
(58) Field of Search ............ 378/98.8, 19; 250/370.14, 250/370.09; 438/96; 257/72

(56) References Cited

U.S. PATENT DOCUMENTS

| | | | | |
|---|---|---|---|---|
| 5,729,021 A | * | 3/1998 | Brauers et al. | 250/370.09 |
| 5,869,922 A | * | 2/1999 | Tolt | 313/310 |
| 6,307,215 B1 | * | 10/2001 | den Boer et al. | 257/59 |
| 6,363,135 B1 | * | 3/2002 | Brauers et al. | 378/98.8 |
| 6,399,962 B1 | * | 6/2002 | Kim | 257/72 |
| 6,404,854 B1 | * | 6/2002 | Caroll et al. | 378/98.8 |
| 6,407,393 B1 | * | 6/2002 | Kim et al. | 250/370.09 |
| 6,423,973 B2 | * | 7/2002 | Choo et al. | 250/370.09 |
| 6,476,867 B1 | * | 11/2002 | Kobayashi et al. | 348/307 |

* cited by examiner

Primary Examiner—Drew A. Dunn
Assistant Examiner—Irakli Kiknadze
(74) Attorney, Agent, or Firm—Rosenberg, Klein & Lee

(57) ABSTRACT

The invention is related to an X-ray image sensory system, including an electrode layer, a conversion layer, a gap layer and a charge collection layer. The system utilizes the "X-ray→charge" conversion layer, and operates in an electrical field to enable the "X-ray→charge→field emission electron" mechanism. The mechanism makes the field emission electrons move from the conversion layer, across the gap layer, and towards the charge collection layer. The charge collection layer is made of specific kinds of semiconductor materials. Based on the amount of the charges collected at the charge collection layer, the system is able to determine the amount of the X-ray initially emitted into the conversion layer.

10 Claims, 3 Drawing Sheets

X-RAY IMAGE SENSORY SYSTEM

BACKGROUND OF THE INVENTION

1. Field of the Invention

The present invention relates to an X-ray image sensory system, and more particularly, to an X-ray image sensory system with the utilization of the field emission mechanism to move the field emission electrons towards the charge collection layer to determine the input amount of the X-ray.

2. Description of the Prior Art

Conventional technology uses films to display X-ray images. An unexposed film is placed behind the screen, which was able to convert X-ray to the wavelength close to visible light. After the film is exposed, it is processed and printed. Thus the image of the X-ray is shown. In the process of exposure, transportation, processing and printing, it is prone to damages. If that happens, the whole process has to be repeated again from the beginning. As for the storage of the films, the space and the security are two the major concerns of the conventional technology.

The digitalization of the X-ray images, and storing them on the digital media can solve the aforementioned problems like the storage space and the security. Digitalized data is easier for transportation and remote access, which becomes imperative in long distance medical diagnosis. With appropriate image processing, digital images could also be used for disease detection. Therefore, the digitalized X-ray images are superior to the conventional film technology.

Currently, to obtain digitalized X-ray images, a converting material is used to convert the X-ray to signals of light or electricity. Coupled with a photodiode or electron collection device, the X-ray could be converted to electrical signals. Passing through A/D (analog/digital converter), the X-ray images are obtained. This method is called direct, in contrast to that converting X-ray to the visible lights, and the latter is named as the indirect one.

Please refer to FIG. 1 of a schematic diagram of a direct X-ray image sensory system 10. The direct X-ray image sensory system 10 includes a bias electrode 12, a conversion layer 13, a pixel electrode 14, and a TFT capacitor module 16. The bias electrode 12 is to connect with an applied bias voltage. The conversion layer 13, which is a semiconductor material, e.g., Se, with the characteristic of generating electron and hole pairs, is used to convert the X-ray into electron and hole pairs.

It works as follows. The conversion layer converts the X-ray signal to e-h (electron-hole) pairs. Due to the applied bias voltage, the e-h pairs are separated, whereas the electrons are pulled to the pixel electrode 14, which induces equivalent electrons at the electrode. The accumulated electrons are stored in the TFT capacitor module 16. The gate of the TFT capacitor module 16 determines when the electrons are released from the TFT capacitor module 16, which means the emission of the signal. And external sequencer (not shown) is used to control the sequence of the emission. Finally, the A/D converter outputs the digitalized image signal. The conversion layer 13 is usually with the value of several hundred micrometers in thickness. The applied bias voltage for generating the bias electrical field is between 1 KV to 10 KVs. Se is the most commonly used material. In general, only some semiconductor materials, which are able to generate e-h pair, are used in the present invention.

However, since this type of X-ray image sensory system requires a comparatively high voltage (several KVs) due to the fact that the free electrons in Se are with comparatively short life times and low mobility. It makes the manufacturing of such sensory system more difficult, as well as higher protection requirements when in use.

There is another type of indirect X-ray image sensory system, in which no high voltage is employed. Instead, it uses a scintillator to absorb the X-ray, converts the X-ray to visible lights, and uses photodiode to detect visible lights. However, for a large size photodiode, about 4*4 inches to 17*17 inches, the yield for this image sensory panel is very low, leading to much more manufacturing costs.

SUMMARY OF THE INVENTION

It is therefore a primary objective of the present invention that the present invention X-ray image sensory system can be operated at a low applied voltage and is with a field emitting architecture for emitting free electrons and collecting corresponding charges to determine the amount of the X-ray.

In accordance with the claimed invention, the present invention includes an electrode layer, a conversion layer, a gap layer, and a charge collection layer. The sensory system employs the "X-ray→charge" conversion layer to operate the "X-ray→charge to field emission electron" mechanism in an appropriate electric field. The field emission electrons are moved towards the charge collection layer made of semiconductor material. Based on the amount of the charges accumulated within the charge collection layer, the original amount of X-ray exposure can be calculated.

It is an advantage of the present invention that a rough surface of the aforementioned conversion layer is shaped into many coarse tips with small curvature radius to make the electron emission be more convenient. And, the present invention X-ray image sensory system is operated at a low voltage to protect the charge collection layer from damages.

These and other objectives of the present invention will no doubt become obvious to those of ordinary skill in the art after reading the following detailed description of the preferred embodiment which is illustrated in the various figures and drawings.

DETAILED DESCRIPTION OF THE PREFERRED EMBODIMENT

Figure 1:
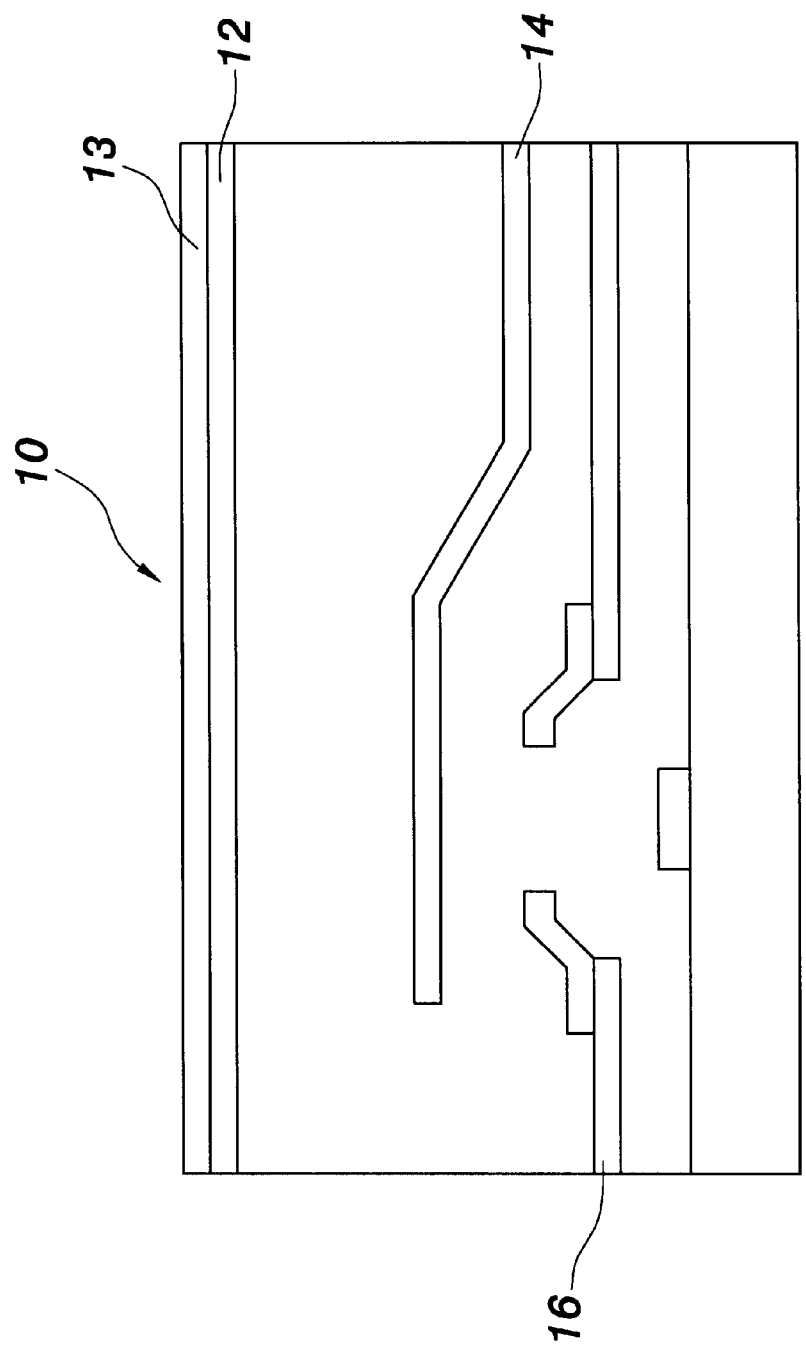
FIG. 1 is a schematic diagram of a prior art X-ray image sensory system.
Figure 2:
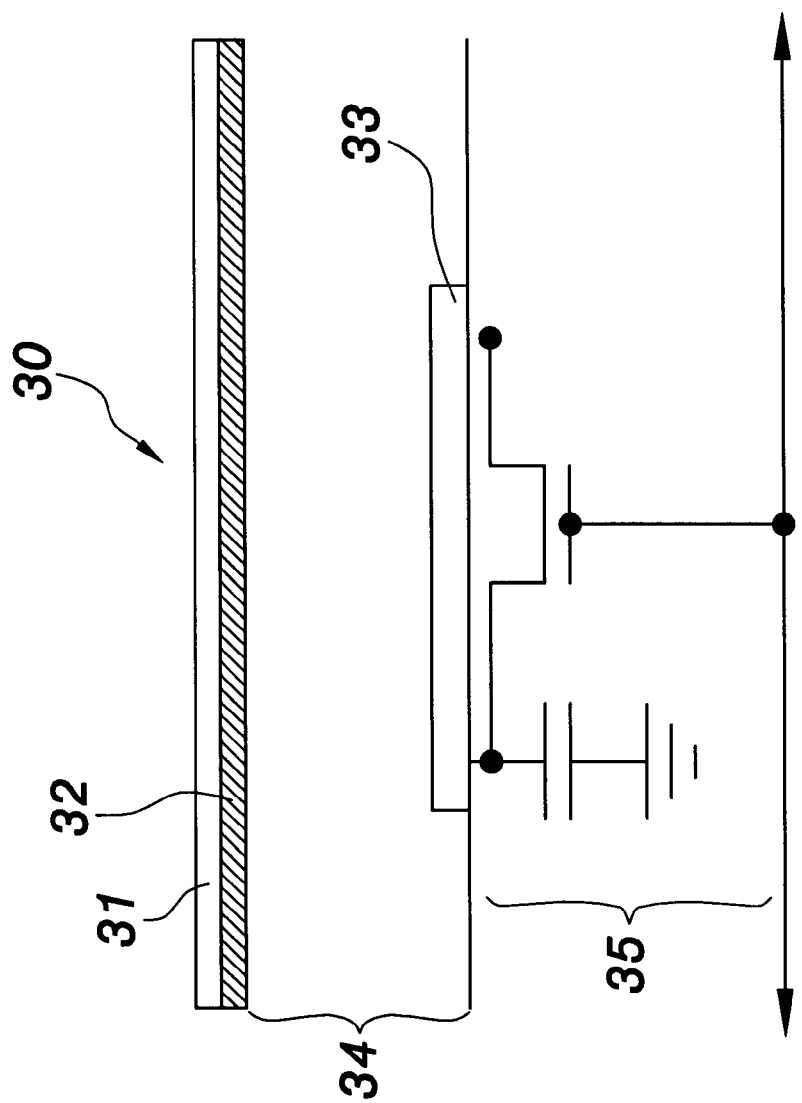
FIG. 2 is a schematic diagram of an X-ray image sensory system according to the present invention.

Please refer to FIG. 2 of a schematic diagram of a present invention x-ray image sensory system 30. The X-ray image sensory system includes an electrode layer 31, a conversion layer 32, a charge collection layer 33, a gap layer 34 between the conversion layer 32 and the charge collection layer 33, and a TFT circuit 35.

The sensory system 30 employs "X-ray→charge" conversion layer 32 to operate the "X-ray→charge→field emission electron" mechanism in an appropriate electrical field. The field emission electrons are moved towards the charge collection layer 33. Based on the amount of the charges accumulated at the charge collection layer 33, the original amount of X-ray exposure at the conversion layer 32 is calculated.

The present invention works as follows. First, a negative bias is imposed upon the electrode layer 31. Because the electrode layer 31 is a good conductor, the negative bias can be evenly distributed at the electrode layer 31, therefore, the negative bias on the conversion layer 32 is also uniformly distributed. Because conversion layer 32 is made of the high resistance semiconductor and of sizeable thickness, the negative bias will decrease in the conversion layer 32.

When the X-ray starts to reach conversion layer 32, the conversion layer 32 will form many e-h (electron-hole) pairs. The pairs will move due to the electrical field formed by the negative bias on the electrode layer 31. The free electrons move towards the surface of the conversion layer 32, facing the gap layer 34, while the holes move towards the electrode layer 31. The formation and the movement of the e-h pairs reduce the resistance of the conversion layer 32. In the mean time, the voltage drop in conversion layer 32 decreases.

Because the imposed bias is fixed, and the resistance of the gap layer 34 is also fixed, the change in the voltage drop will enable the field emission at the surface of the conversion layer 32.

The strength of the emission depends on the number of the free electrons at conversion layer 32, and the amount of e-h pairs is proportional to the strength of the incoming X-ray.

The selection of the material for the conversion layer 32 is mainly in the conversion efficiency. In general, the higher the bandgap energy the conversion layer 32 is with, the lower the efficiency the conversion layer 32 is. But this does not imply that every material with low bandgap energy is suitable. Considering the operation at the room temperature, the environment could provide energy higher than 1.5 eV, which is enough to form the e-h pairs in the material. These charges are what we call noises. With the electrical field formed by the applied bias voltage, the charges can collide with other atoms to generate more e-h pairs, which will amplify the noise level. Therefore, using material with higher bandgap energy is more suitable for the practical purpose. The conversion layer 32 can, in addition to converting the X-ray to charges, also protect the circuits. When the conversion layer 32 absorbs the X-ray, it reduces the amount of the un-absorbed X-ray, which will incur additional noises and radiation on the circuits behind the conversion layer 32.

Furthermore, the field emission requires a high-intensity electrical field. In order to avoid the heat generated in the electrical field, the present invention reduces the curvature radius of local area, such as including a rough surface of the conversion layer 32 and shaping the rough surface into a plurality of tips. These tips are with the tip, sheet, or nanotubes shapes. Because the electrons within the material are bounded by the neighboring atoms, they can not escape the bounds and become the free electrons easily. In general, it takes an electrical field to raise the energy level of the electrons enough to escape the bounds, and so the electrons at the surface of the material can become free electrons. The electrons have the characteristics of both particles and wave. If the neighboring atoms form a low energy well with a corresponding atom, which a specific electron belongs to, the possibility of the electron resides out of the energy well increase due to the wave characteristic of the electron. In the mean time, if an electrical field is imposed on the electron, the possibility of the electron escaping the bound and becoming a free electron is higher. The electrons generated by the aforementioned method are called field emission electrons. In a regularly-structured material, the neighboring atoms create a large energy well on the electrons, thus it requires a large electrical field to make the electrons escape. Also, the internal electrons are bounded by the atoms around them, while the surface electrons are only bounded by the atoms underneath. Thus, it is easier for the surface electrons to become field emission electrons. In addition, reducing the number of the neighboring atoms can also lessen the energy bounds on the electrons. By shaping the rough surface into a plurality of small tips, sheets, or nanotubes, the surface electrons of the conversion layer 32 are bounded with less neighboring atoms. Therefore, it could create local focal areas to enable the field emission to occur.

Furthermore, there must be a gap layer 34 between the conversion layer 32 and the charge collection layer 33. This gap layer 34 is needed to be easy for electrons to travel across. A vacuum environment meets this requirement. The vacuum gap layer 34 serves the following functions. First, the conversion layer 32 and the charge collection layer 33 need to be separated for the field emission to take place, and the gap layer 34 serves this purpose. That is a gap layer 34 is a necessary condition for the field emission to take place. Second, the electrons traveling across the vacuum gap layer 34 can gain energy from the electrical field within the gap layer, thus, can be accelerated to a higher kinetic level. The electrons with higher kinetic levels, when hitting the charge collection layer 33 made of some kinds of semiconductors, can create additional e-h pairs. This is similar to amplifying the original electrical signal. Third, in the prior art direct X-ray sensory systems, some capacitors are worn out due to the overcharges, resulted from the X-ray overdosed sensor area. In the present invention, the vacuum gap layer 34 provides a buffer to prevent the capacitor from being crashed by the high speed electrons. Fourth, the vacuum gap layer 34 can be regarded as a capacitor in series with that of the charge collection layer 33. Compared to the individual charge collection layer 33, the vacuum gap layer 34 has a much larger area. When the voltage on the capacitor at the charge collection layer 33 is too high, the extra voltage could be passed to the conversion layer 32 through the vacuum gap layer 34. In practice, because the conversion layer 32 has a much larger area as well, the voltage (charge) passed to it through the vacuum gap layer 34 will little impact on the voltage load. Therefore, the vacuum gap layer 34 provides a necessary protection to the charge collection layer 33.

Because the field emitting electrons can obtain kinetic energy when traveling across the vacuum gap layer 34, the original electrical signal can be amplified when the electrons hit the charge collection layer 33. Therefore, the present invention has a higher sensitivity towards a weak X-ray exposure, and can detect an even smaller amount of X-ray.

The free electrons, collected by the charge collection layer 33 from the conversion layer 32, can be further read by the known TFT circuits at the later stage.

Compared to the prior art direct X-ray sensory devices, which require a voltage up to several KVs to collect charges, the present invention requires only a voltage of several hundred volts. Because the electrical fields depends on the external voltage bias and the distance of the gap layer 34, the required voltage can be lowered by reducing the distance of the gap layer 34 between the conversion layer 32 and the charge collection layer 33. The governing law of this relationship is:

$$E = V/d$$

where E: electrical field, V: externally supplied voltage, d: gap distance

That is, for a fixed value of E, the V is proportional to the d. Considering that the E must be higher than 1 MV/m, and the voltage is totally on the conversion layer 32 before the field emission takes place, a voltage that is too high may cause permanent damage such as breakdown to the conversion layer 32.

As it seems that a smaller d is more desirable since it only takes a smaller voltage to create a large electrical field. However, considering the economical factor and the quality of the manufacturing, when the d is too small, the quality of the surface of the conversion layer 32 will determine the possibility of a short circuit between conversion layer 32 and the charge collection layer 33 when the external voltage bias is applied. On the other hand, the external voltage bias within a reasonable range will help the movement of the e-h pairs within the conversion layer 32. Taking all the material characteristics, manufacturing technology, and the system operation condition into account, the gap layer 34 should be within the range of 50 to 1000 micrometers. With this, the external voltage bias needs to be between 50 V to 1000 V, which is much lower than the several thousand volts required by the prior art X-ray image sensory devices.

Figure 3:
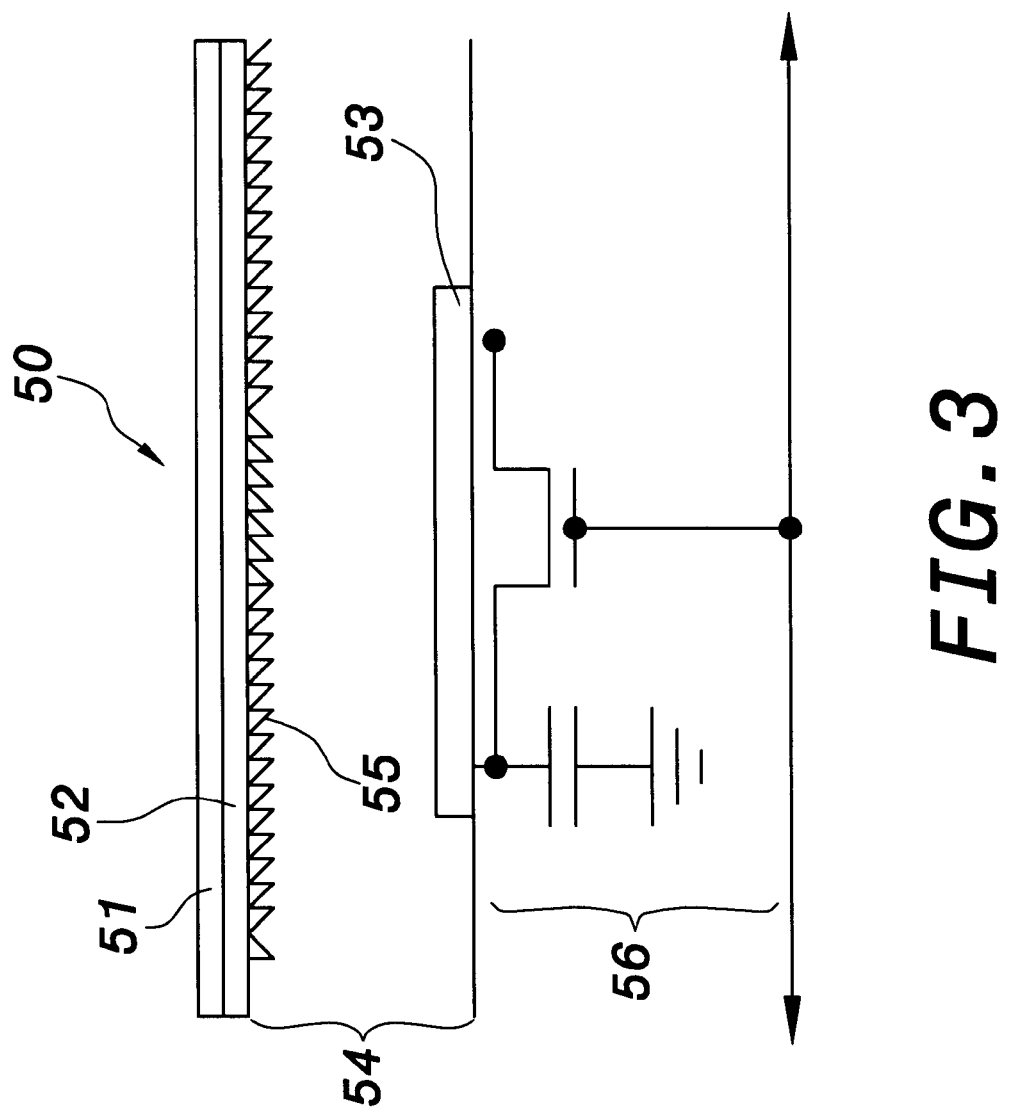
FIG. 3 is a schematic diagram of another X-ray image sensory system according to the present invention.

Please refer to FIG. 3 of another schematic diagram of an X-ray image sensory system 50. The X-ray image sensory system 50 also includes an electrode layer 51 for applying a voltage bias, a conversion layer 52 for converting X-ray, a charge collection layer 53 for collecting field emission electrons converted from the conversion layer 52, a gap layer 54 between the conversion layer 52 and the charge collection layer 53, a field emission layer 55 for emitting converted field emission electrons, and a TFT circuitry 56. The voltage bias is for driving the field emission electrons from the field emission layer 55 to the charge collection layer 53. The above describes the present invention of an X-ray image sensory system utilizing a field emission mechanism. For further enhancement of the above field emission mechanism, the present invention provides another implementation, in which a field emission layer 55 is grown underneath the conversion layer 52.

When the X-ray starts to affect conversion layer 52, the voltage change in conversion layer 52 is reflected on the field emission layer 55. So, the voltage on the field emission layer 55 increases.

Under such circumstances, a large amount of free electrons will run to the field emission layer 55, and as the voltage on the field emission layer 55 increases, the field emission will take place on the surface of the field emission layer 55.

As described, the formation of the e-h pairs will lower the voltage on the conversion layer 52, that is, the electrical field within the conversion layer 52 is lowered. When the X-ray is stronger, more e-h pairs are generated, which, in turn, cause the further reduction of the electrical field, while maintaining the capability of moving the e-h pairs. So, the field emission layer 55 underneath these areas will gain additional voltage, thus, the enhanced field emission mechanism. On the other hand, if less e-h pairs are generated, the field emission is milder. Therefore the difference between the strength of the X-ray is amplified.

The field emission layer 55 requires a high electrical field instead of a high temperature for emitting the free electrons. The mechanism does not raise the energy level of the electrons to escape the atomic bond, instead, it uses the applied electrical field to narrow the width of the energy well surrounding the electrons. With the tunneling effect, the electrons are able to penetrate and escape free.

However, because of the field emission process, the vibration energy of the electrons will increase. If the energy well is not high enough, the electrons may penetrate the energy well, and move between atoms. This is undesirable for the field emission mechanism. The worst scenario is that the heat generated by the moving electrons will cause the temperature of the material to raise, leading to the melting of the material. So, the material used for field emission layer 55 must have a high energy gap, such as SiC, Diamond, Mo, and W, or their compounds. But for the continuity of the field emission, the resistance of the selected material should not be too high, because they can not sustain to provide enough free electrons for field emission. Therefore, the selected material must have both high energy gap and high conductivity, such as DLC (diamond like carbon) compounds, which has high energy gap Sp3 carbon, and high conductivity Sp2 carbon.

Similarly, the field emission layer 55 includes a rough surface in order to avoid the heat generated by the high electrical field. The rough surface is with a plurality of tips shaped into a tip-like, sheet-like, or nanotubes-like shape, and, furthermore, these tips are with small curvature radius for the convenience of the occurrence of the filed emission.

The gap layer 54 between the field emission layer 55 and the charge collection layer 53 is also set to be within the range of 50 to 1000 micrometers, as previously stated.

In comparison with prior arts, the present invention provides an X-ray image sensory system with a plurality kinds of small curvature radius tips, for the convenience of the occurrence of the field emission, on the rough surface of the conversion layer and the filed emission layer. And, with the existence of the gap layer, the X-ray image sensory system can be operated at a comparative low input voltage bias. Moreover, the charge collection layer can be with an overcharge protection due to the setting of the gap layer also.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An X-ray image sensory system comprising:
   an electrode layer;
   a charge collection layer;
   a conversion layer having a roughly-contoured emission surface, said roughly-contoured emission surface forming a plurality of emission tips for emitting field emission electrons; and,
   a gap layer positioned between said conversion layer and said charging layer, wherein a voltage bias is applied to said conversion layer for driving said field emission electrons to said charge collection layer.

2. The X-ray image sensory system as recited in claim 1, wherein said gap layer is between 50 micrometers and 1000 micrometers in thickness.

3. The X-ray image sensory system as recited in claim 1, wherein said conversion layer is formed of a high bandgap energy material.

4. The X-ray image sensory system as recited in claim 1, wherein said charge collection layer is a semiconductor material layer.

5. An X-ray image sensory system comprising:
   an electrode layer;
   a conversion layer having a roughly-contoured emission surface, said roughly-contoured emission surface forming a plurality of emission tips for emitting field emission electrons;
   a field emission layer;

a gap layer; and, a charge collection layer, wherein a voltage bias is applied to said conversion layer for driving said field emission electrons from said field emission layer to said charge collection layer.

6. The X-ray image sensory system as recited in claim 5, wherein said gap layer is between 50 micrometers and 1000 micrometers in thickness.

7. The X-ray image sensory system as recited in claim 5, wherein said conversion layer is formed of a high bandgap energy material.

8. The X-ray image sensory system as recited in claim 5, wherein said field emission layer is formed of a high bandgap energy material and a high conductivity material.

9. The X-ray image sensory system as recited in claim 5, wherein said field emission layer is formed of a diamond-like carbon compound.

10. The X-ray image sensory system as recited in claim 5, wherein said charge collection layer is a semiconductor material layer.

* * * * *